(12) United States Patent
Pautis (10) Patent No.: US 9,783,314 B2
(45) Date of Patent: Oct. 10, 2017

(54) FOLDABLE GUIDING VENTILATOR COVER FOR AN AIRCRAFT ENGINE ASSEMBLY

(71) Applicant: Airbus Operations S.A.S., Toulouse (FR)

(72) Inventor: Olivier Pautis, Merville (FR)

(73) Assignee: Airbus Operations S.A.S. (FR)

( * ) Notice: Subject to any disclaimer, the term of this patent is extended or adjusted under 35 U.S.C. 154(b) by 265 days.

(21) Appl. No.: 14/811,152

(22) Filed: Jul. 28, 2015

(65) Prior Publication Data

US 2016/0031563 A1 Feb. 4, 2016

(30) Foreign Application Priority Data

Jul. 31, 2014 (FR) ..................................... 14 57436

(51) Int. Cl.
*B64D 29/08* (2006.01)
*B64D 29/06* (2006.01)
(Continued)

(52) U.S. Cl.
CPC ............. *B64D 29/00* (2013.01); *B64D 27/26* (2013.01); *B64D 29/06* (2013.01); *B64D 29/08* (2013.01);
(Continued)

(58) Field of Classification Search
CPC ........ B64D 29/00; B64D 29/02; B64D 29/06; B64D 29/08; B64C 7/00; B64C 7/02; B64C 1/1446
See application file for complete search history.

(56) References Cited

U.S. PATENT DOCUMENTS 5,213,286 A * 5/1993 Elliott .................... B64D 29/06
16/368
5,303,508 A * 4/1994 Porte .................... B64C 1/1446
123/41.04
(Continued)

FOREIGN PATENT DOCUMENTS

FR 2 862 045 A1 5/2005
FR 2 890 378 A1 3/2007
WO 2010/007218 A1 1/2010

OTHER PUBLICATIONS

French Search Report—FR 14 57436 (Mar. 16, 2015).

*Primary Examiner* — Pascal M Bui Pho
*Assistant Examiner* — Rene Ford
(74) *Attorney, Agent, or Firm* — Lerner, David, Littenberg, Krumholz & Mentlik, LLP (57) ABSTRACT

For gains in terms of aerodynamic performance levels, an aircraft engine assembly includes a turbomachine, a fastening strut for the turbomachine, and at least one foldable ventilator cover which surrounds the turbomachine and which includes: a first cover sector which includes a first end portion which is mounted so as to be articulated to the fastening strut, along a first articulation axis, and a second cover sector which includes a first end portion which is mounted so as to be articulated to a second end portion of the first cover sector, along a second articulation axis parallel with the first articulation axis. The second end portion is mounted so as to be guided at one side and the other thereof by a thrust inverter cover of the engine assembly and an air inlet structure of this assembly, respectively.

14 Claims, 6 Drawing Sheets

(51) Int. Cl.
  *B64C 7/02*    (2006.01)
  *B64D 29/00*   (2006.01)
  *B64D 27/26*   (2006.01)
  *F02K 1/18*    (2006.01)
  *F02K 1/08*    (2006.01)
  *B64D 29/02*   (2006.01)

(52) U.S. Cl.
  CPC ............... *F02K 1/085* (2013.01); *F02K 1/18* (2013.01); *B64C 7/02* (2013.01); *B64D 29/02* (2013.01)

(56) References Cited

U.S. PATENT DOCUMENTS

| | | | |
|---|---|---|---|
| 5,350,136 A * | 9/1994 | Prosser | B64D 29/08 244/118.2 |
| 7,007,890 B2 | 3/2006 | Beutin et al. | |
| 8,091,832 B2 | 1/2012 | Marche | |
| 8,956,109 B2 | 2/2015 | Regard | |
| 2004/0104583 A1* | 6/2004 | Porte | B64D 29/06 292/229 |
| 2011/0091317 A1* | 4/2011 | Regard | B64D 29/08 415/201 |
| 2014/0334922 A1* | 11/2014 | Fabre | B64D 29/08 415/201 |
| 2016/0288916 A1* | 10/2016 | Todorovic | B64D 29/08 |

* cited by examiner

FIG. 9

FOLDABLE GUIDING VENTILATOR COVER FOR AN AIRCRAFT ENGINE ASSEMBLY

TECHNICAL FIELD

The invention relates to the field of engine assemblies for an aircraft, preferably commercial airplanes. It preferably relates to engine assemblies which are intended to be fixed below the wings of the aircraft.

The invention more specifically relates to the design of the ventilator covers with which the nacelle of the engine assemblies is provided.

BACKGROUND OF THE INVENTION

Aircraft engine assemblies are developing so as to have an increasingly high level of dilution. This results in an increase of the diameter of the ventilator, accompanied by an increase of the size of the ventilator covers with which the nacelle is provided.

Ventilator covers, which are generally articulated to a fastening strut, enable an aerodynamic function to be ensured during flight, being followed by the external air. Furthermore, when they are in the open position on the ground, they enable access to the turbomachine and the equipment thereof in order to carry out maintenance operations.

The increase of the size of these covers presents specific problems, such as that of aerodynamic performance levels. This is because, during flight, the ventilator covers which are suspended on the fastening strut are subjected to deformations under the force of pressure of the external air. These deformations become even greater as the covers increase in size, therefore resulting in a substantial reduction of the aerodynamic performance levels of the engine assembly. Another problem connected with the covers having large dimensions is the risk of interaction with the tips of movable flaps of the leading edge of the wing unit during maximum opening. From the prior art, there is, for example, known the document WO 2010/007218 which proposes foldable ventilator covers which are suspended in the region of the junction between the fuselage and the strut, the strut being laterally fixed to the fuselage at the rear portion of the aircraft. However, this solution does not solve the problems set out above, which are linked to the aerodynamic performance levels and to the risks of interactions.

There is therefore a need for optimization of the design of ventilator covers with which the nacelles of aircraft engine assemblies are provided.

BRIEF SUMMARY OF THE INVENTION

An aspect of the invention may at least partially overcome the disadvantages mentioned above, in relation to the embodiments of the prior art.

To this end, the invention relates to an aircraft engine assembly which comprises a turbomachine, a fastening strut for the turbomachine, and at least one foldable ventilator cover which surrounds the turbomachine and which comprises:

a first cover sector which comprises a first end portion which is mounted so as to be articulated to the fastening strut, along a first articulation axis, the first cover sector comprising a second end portion opposite the first, in a circumferential direction of the cover; and a second cover sector which comprises a first end portion which is mounted so as to be articulated to the second end portion of the first cover sector, along a second articulation axis parallel with the first articulation axis, the second cover sector comprising a second end portion opposite the first, in the circumferential direction of the cover.

According to an embodiment of the invention, the second end portion of the second cover sector is mounted so as to be guided at one side and the other thereof by a thrust inverter cover at the rear and an air inlet structure at the front of the engine assembly, respectively.

An aspect of the invention thus advantageously provides for a guiding of the foldable cover using adjacent elements of the engine assembly, that is to say, the thrust inverter cover and the air inlet structure. In a closed position, this guiding provides a circumferential retention of the cover in addition to the mechanical connection thereof with respect to the fastening strut. The result is better resistance to deformation of the cover and, consequently, an improvement of the general aerodynamic performance levels of the engine assembly.

The invention further has at least one of the following optional technical features, taken in isolation or together.

The thrust inverter cover of the engine assembly and the air inlet structure of this assembly comprise two guiding rails for the second end portion of the second cover sector, respectively.

The two guiding rails each have a shape substantially in the form of a circular arc, centered on an axis of the engine assembly.

The ventilator cover comprises a mechanism for locking the cover in a closed position, the mechanism cooperating with the cover of the thrust inverter of the engine assembly and/or with the air inlet structure of this assembly.

The locking mechanism of the cover comprises a manual actuation means, for example, a handle, which is arranged close to an articulated connection between the first cover sector and the second cover sector.

The actuation means is arranged, in a closed position of the ventilator cover, on or close to a diametral plane of the engine assembly, in a state orthogonal to a diametral plane of this assembly extending via the fastening strut.

The engine assembly comprises a third cover sector which comprises a first end which is mounted so as to be articulated to the second end portion of the second cover sector, along a third articulation axis which is parallel with the first articulation axis, the third cover sector comprising a second end portion which is opposite the first, in the circumferential direction of the cover, and which is mounted so as to be guided at one side and the other thereof by the thrust inverter cover of the engine assembly and the air inlet structure of this assembly, respectively.

The second end portion of the third cover sector cooperates, at one side and the other thereof, with the two guiding rails, respectively.

At least one of the cover sectors is provided with an inspection hatch.

The first and second cover sectors are configured to fold in the manner of a wallet along the second articulation axis when the cover is moved from a closed position to an open position.

The engine assembly comprises two ventilator covers, each extending around the turbomachine over approximately 180°.

In a closed position of the two ventilator covers, the two third cover sectors are arranged in aerodynamic continuation of each other, being substantially diametrically opposed relative to the fastening strut.

The invention relates to an aircraft which comprises at least one engine assembly as described above, preferably suspended under each wing of the aircraft.

Other advantages and features of the invention will be appreciated from the non-limiting detailed description below.

BRIEF DESCRIPTION OF THE DRAWINGS

This description will be given with reference to the appended drawings, in which.

DETAILED DESCRIPTION

Figure 1:
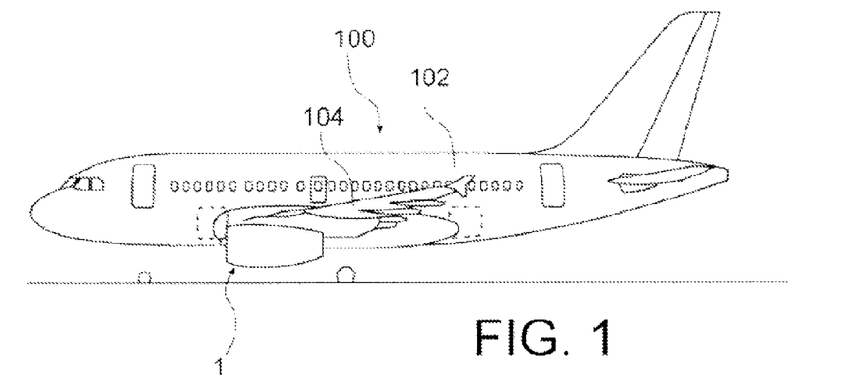
FIG. 1 is a side view of an aircraft according to an embodiment of the invention.

With reference to FIG. 1, an aircraft is illustrated according to a preferred embodiment of the invention, in the form of a commercial airplane which typically comprises a number of passenger seats greater than one hundred. The airplane 100 generally comprises a fuselage 102 and two wings 104 below each of which one or more engine assemblies 1 which are specific to the invention are suspended. Such an engine assembly 1 will now be described in a more detailed manner with reference to FIG. 2.

Figure 2:
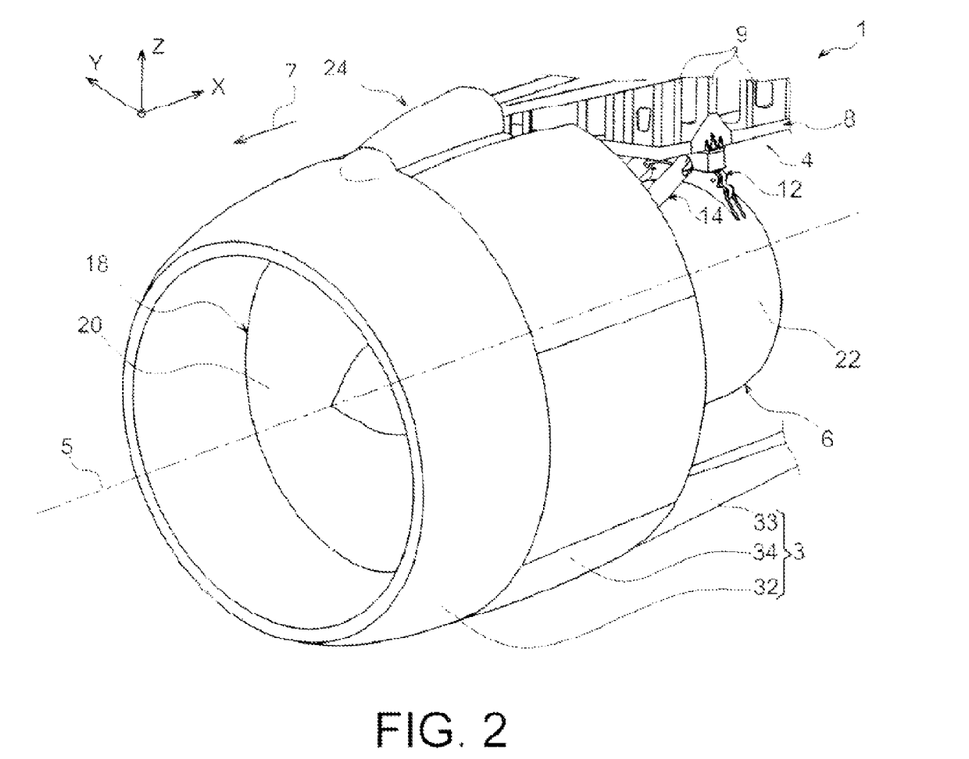
FIG. 2 is a perspective view of one of the engine assemblies with which the aircraft shown in the preceding Figure is provided.

The engine assembly 1 comprises a fastening device 4 referred to as a fastening strut, a turbomachine 6 of the turbojet type which is fastened under the strut 4, and a nacelle 3.

In the remainder of the following description, the direction X conventionally corresponds to the longitudinal direction of the strut 4 which is also similar to the longitudinal direction of the turbojet 6, this direction X being parallel with a longitudinal axis 5 of the turbojet 6. On the other hand, the direction Y corresponds to the direction which is orientated transversely relative to the strut 4 and which is also similar to the transverse direction of the turbojet 6. Finally, the direction Z corresponds to the vertical direction or height direction, these three directions X, Y and Z being mutually orthogonal.

On the other hand, the terms "front" and "rear" are intended to be considered relative to an advance direction of the aircraft encountered following the thrust applied by the turbojet 6, this direction being indicated schematically by the arrow 7.

Generally, the fastening strut 4 comprises a rigid structure 8, which is also called a primary structure and which carries fastening means of the turbojet 6, these fastening means having a plurality of engine attachments 12, and a device for recovery of the thrust forces 14 generated by the engine 6. The device 14 conventionally comprises two lateral connecting rods.

By way of indication, it should be noted that the fastening strut 4 comprises another series of attachments (not illustrated) which are fitted to the rigid structure 8 and which enable this assembly 1 to be suspended under the wing of the aircraft.

Furthermore, the fastening strut 4 comprises a plurality of secondary structures which are fitted to the rigid structure 8. These secondary structures ensure the separation and the retention of the systems whilst supporting aerodynamic fairing elements.

The turbojet 6 has at the front a large ventilator housing 18 which delimits an annular ventilator channel 20 for the passage of the flow of secondary air of the engine. Toward the rear, it comprises a smaller central housing 22 which surrounds the core of this turbojet, for the passage of the primary flow of air. The housings 18 and 22 are of course fixedly joined to each other and have a junction which is generally referred to as the intermediate housing.

In this preferred embodiment of the present invention, the rigid structure 8 is in the form of a casing which extends from the front to the rear, substantially in the X direction. The casing 8 which can be seen in FIG. 2 is in the form of a strut which has a similar configuration to that which is conventionally seen for fastening struts of turbojets, in particular in that it is provided with transverse ribs 9 which are each in the form of a rectangle which is orientated in a plane YZ.

The nacelle 3 comprises, in the region of the front end thereof, an annular air inlet structure 32 which is fixed to the front of the ventilator housing 18. This structure which is also referred to as an air inlet 32 is directly followed toward the rear by two ventilator covers 34 (only one of which can be seen as a result of the perspective view), each being mounted in an articulated manner on a portion of the fastening strut 4, and more specifically on a secondary aerodynamic structure 24 which is located at the front of this strut, and which is fixedly joined to the rigid structure 8. As will be set out in detail below, the ventilator covers 34 have the specific feature of being foldable.

On the other hand, the nacelle 3 comprises, in the rear continuation of the ventilator covers 34, two thrust inverter covers 33 which are mounted so as to be articulated to the rigid structure 8 of the strut. In FIG. 2, only a small portion of one of these inverter covers 33 has been illustrated in order to allow the fastening strut 4 and the housing 22 of the turbojet to be seen.

Figure 3:
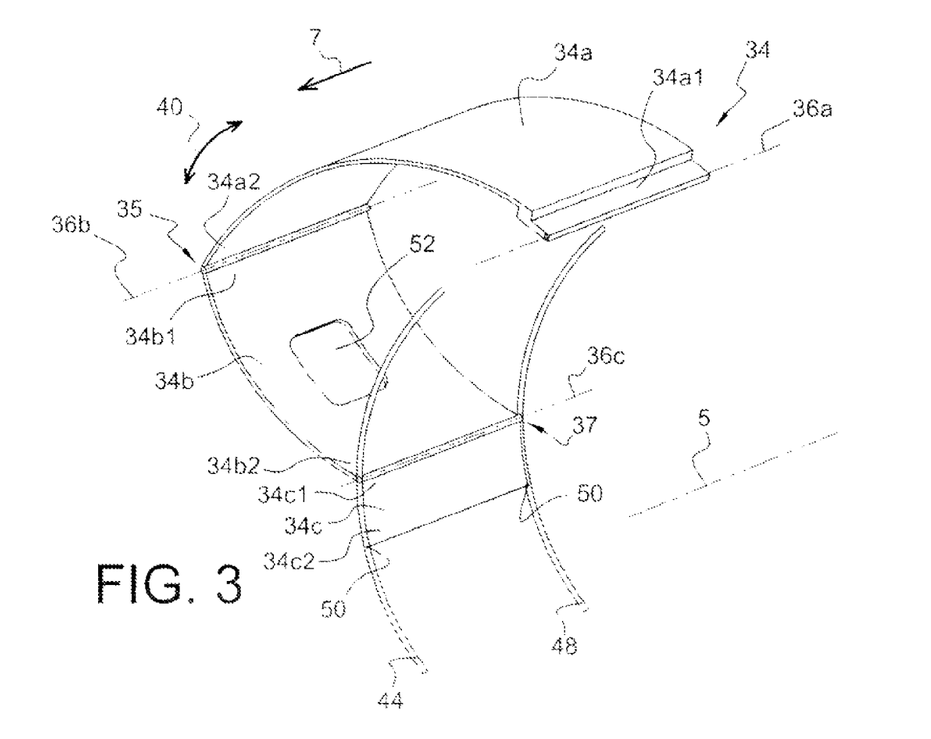
FIG. 3 is a more detailed perspective view of one of the ventilator covers specific to an embodiment of the invention, with which the nacelle of the engine assembly shown in the preceding Figures is provided.
Figure 4:
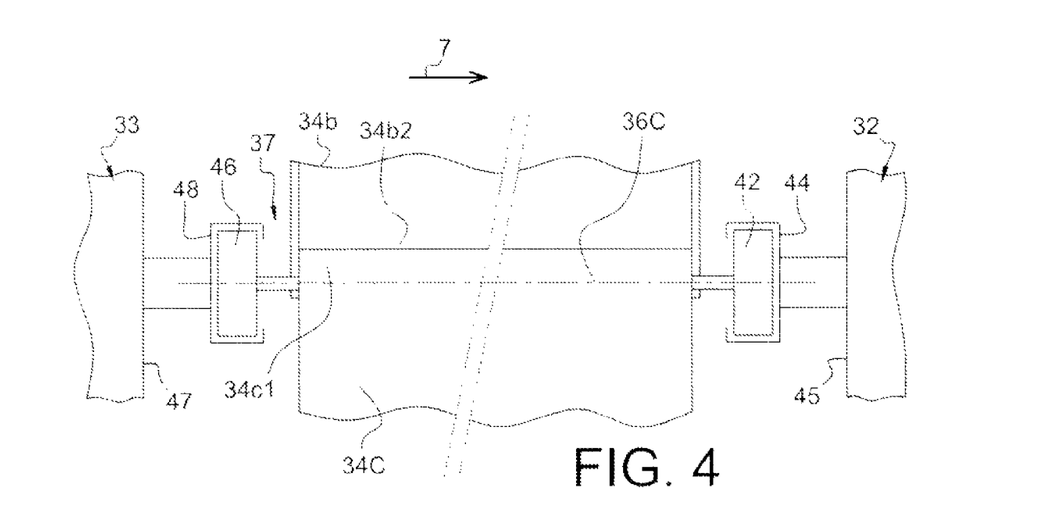
FIG. 4 is a schematic view of a portion of the ventilator cover shown in the preceding Figure.
Figure 5:
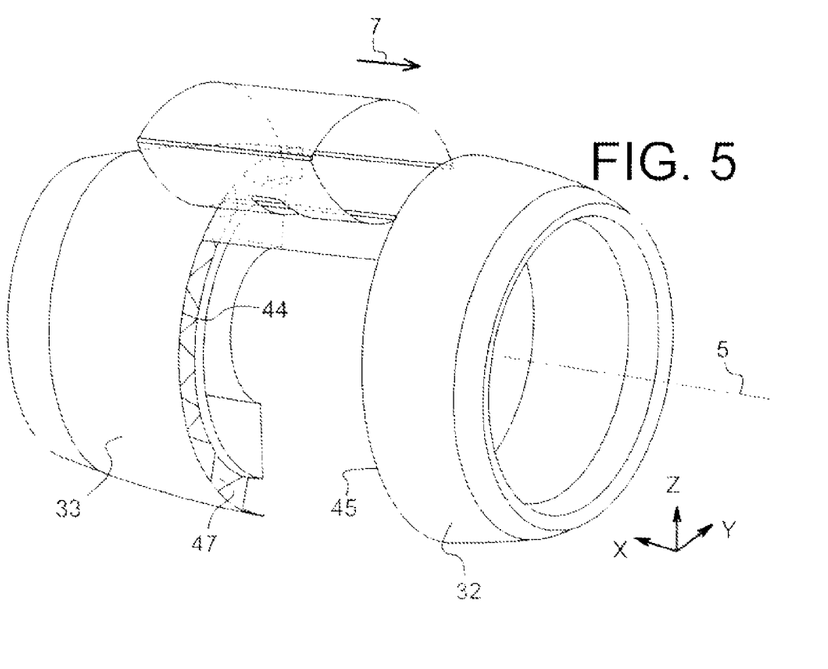
FIG. 5 is a perspective view of the nacelle, with the ventilator cover in an open position.

With reference now to FIGS. 3 to 5, the configuration of one of the two ventilator covers 34 will be set out in detail. It should be noted that the other ventilator cover 34 which is not illustrated in these Figures has a symmetrical configuration.

The cover 34 is in this instance provided with three cover sectors 34a, 34b, 34c which are arranged in continuation of each other in the circumferential direction 40.

These are firstly a first cover sector 34a which comprises a first end portion 34a1 and a second end portion 34a2 which is opposite the first in the circumferential direction 40. The first end portion 34a1 is mounted so as to be articulated to the structure 24 of the fastening strut (not illustrated in FIGS. 3 to 5), along a first articulation axis 36a which is substantially parallel with the longitudinal axis 5 of the turbojet.

The cover 34 also comprises a second cover sector 34b which comprises a first end portion 34b1 and a second end portion 34b2 opposite the first, in the circumferential direction 40. The first end portion 34b1 is mounted so as to be articulated to the second end portion 34a2 of the first cover sector 34a, along a second articulation axis 36b which is parallel with the first articulation axis 36a. The portions 34a2 and 34b1 form an articulated connection 35 which confers a foldable character on the cover 34. That is to say, the cover 34 can be folded in the manner of a wallet along the second articulation axis 36b, in the region of the connection 35 thereof, when the cover is moved from a closed position to an open position. Such a movement will be described below.

The cover 34 also comprises a third cover sector 34c which comprises a first end portion 34c1 and a second end portion 34c2 opposite the first, in the circumferential direction 40. The first end portion 34c1 is mounted so as to be articulated to the second end portion 34b2 of the second cover sector 34b along a third articulation axis 36c which is parallel with the axes 36a, 36b and which enables the above-mentioned folding. This is because the portions 34b2 and 34c1 form another articulated connection 37.

Each ventilator cover 34 extends circumferentially around the turbojet 6, through approximately 180°. This value may effectively be slightly less as a result of the circumferential extent of the portion of the strut, to which portion these covers 34 are articulated. The first cover sector extends, for example, over approximately 90°, the second over approximately 60°, and the third over approximately 30°. One or more of these sectors 34a, 34b, 34c may have one or more inspection hatches 52 which afford access to specific items of equipment which are enclosed in the nacelle, without requiring that the ventilator cover 34 be raised.

One of the specific features of the invention is that the second end portion 34b2 of the second cover sector 34b is mounted so as to be guided, at one side and the other thereof, in the axial direction, that is to say, to the front and to the rear of this second cover sector 34b. This is because there is provision for the end portion 34b2 to be guided in the region of the front axial end thereof, via the air inlet structure 32 which is located axially opposite. There is also provision for this end portion 34b2 to be guided in the region of the rear axial end thereof, by the adjacent inverter cover 33, which is also located axially opposite.

The above-mentioned guiding may be carried out in a direct manner, that is to say, with guiding means which are directly connected to the relevant end portion 34b2, or in an indirect manner, via the end portion 34c1. In this latter case, the guiding means would be directly connected to this end portion 34c1. Therefore, it should be understood that, regardless of the configuration considered, it is the assembly of the articulated connection 37 which is mounted so as to be guided at one side and the other thereof, in the region of the axial upstream and downstream ends thereof.

In order to carry out this guiding, there is preferably provided a system of rails and rollers. By way of example, the front axial end of the portion 34b2 is provided with a roller 42 which is mounted so as to rotate about an axis which is parallel with that of the third articulation axis 36c. This roller 42 is movably accommodated in a C-shaped guiding rail 44 which is fixedly joined to the air inlet structure 32 and which travels along the circumferential edge of this structure 32. Preferably, the rail 44 is fixedly mounted on the rear frame 45 of the air inlet structure 32. In a similar manner, the rear axial end of the portion 34b2 is provided with a roller 46 which is mounted so as to rotate about an axis parallel with that of the third articulation axis 36c. This roller 46 is movably accommodated in a C-shaped guiding rail 48 which is fixedly joined to a structure of the inverter cover 33, and which moves along the circumferential edge of this cover. Preferably, the rail 48 is fixedly mounted on the front frame 47 of the inverter cover.

The two guiding rails 44, 48 are substantially identical and parallel, in the form of circular arcs which are centered on the axis 5. They each extend over a circumferential extent in the order, for example, of 150°. They have a radius of curvature which is identical or similar to that of the cover sectors 34a, 34b, 34c.

During flight, the guiding carried out brings about a retention of the cover 34 in addition to the articulated connection thereof with respect to the fastening strut. This results in better resistance to the deformation of the cover, and therefore an improvement of the aerodynamic performance levels. These are further reinforced when the second end portion 34c2 of the third cover sector 34c is also mounted so as to be guided on the adjacent inverter cover 33, and on the air inlet structure 32. This guiding is preferably carried out in an identical or similar manner to that set out above for the articulated connection 37, preferably by fitting other rollers which are intended to travel within the same rails 44, 48. In a state guided in the region of the two opposing end portions 34c1 and 34c2 thereof, it is the assembly of the third cover sector 34c which is guided by the rails 44, 48. These additional guiding locations, which are designated 50 in FIG. 3, are offset circumferentially from those which are attached to the articulated connection 37, and effectively enable the movements and the deformations of the ventilator cover 34 to be limited in an even more satisfactory manner during flight phases.

Figure 6:
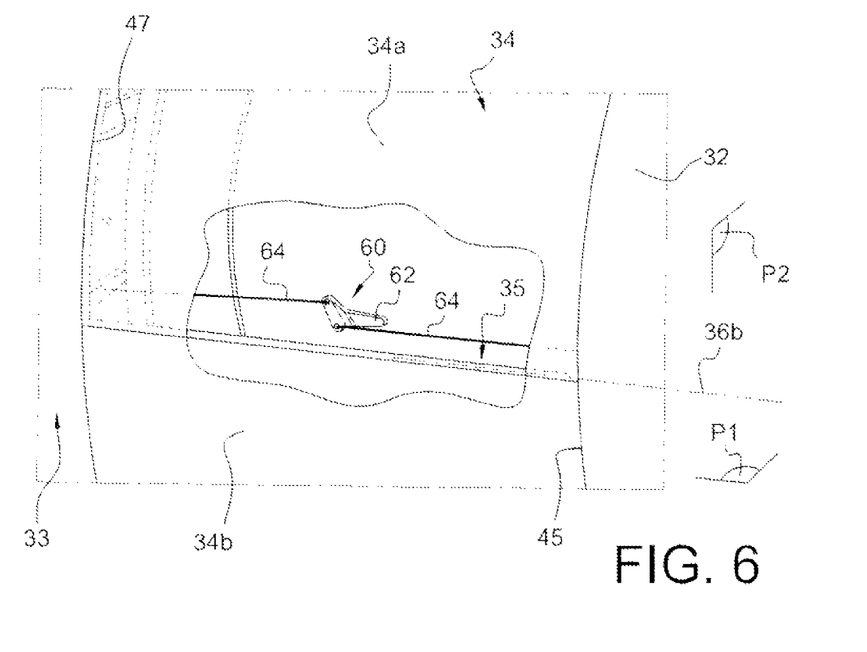
FIG. 6 is an enlarged view at the side of the locking mechanism of the ventilator cover.

With reference now to FIG. 6, the ventilator cover 34 is provided with a mechanism 60 for locking the cover in a closed position. The mechanism 60 comprises a manual actuation means, for example, a handle 62. This handle is arranged close to the articulated connection 35 between the two cover sectors 34a, 34b. That is to say, in the closed position of the ventilator cover 34, this handle is arranged on or close to a diametral plane P1 of the engine assembly, in a state orthogonal to another vertical diametral plane P2 which extends via the fastening strut.

The mechanism 60 further comprises connecting rods 64 which are controlled by the handle 62. These connecting rods extend substantially axially and each have a distal end in the form of a lock which, in the locked position of the mechanism, cooperates with the frames 45, 47 of the air inlet 32 and the inverter cover 33, respectively. The configuration of the mechanism is such that the rotation of the handle 62, from the outer side of the cover 34, allows the connecting rods 64 to be moved axially in order to engage the locks in the frames 45, 47 or, conversely, to extract the locks from these frames. Nonetheless, any other linkage system may be envisaged, without departing from the scope of the invention. Furthermore, it is indicated that this locking mechanism 60 is additional to the guiding which is provided by the above-mentioned rollers and rails. Therefore, in the locked position adopted during flight, the mechanism 60 provides further anchoring locations of the cover, which are offset circumferentially from the other locations mentioned above. This allows the resistance of the cover with respect to displacement and deformation to be even further improved, resulting in better aerodynamic performance levels.

Furthermore, the locking mechanism 60 is no longer located in a 6 o'clock position as in the prior art, but instead becomes accessible laterally. The handling is facilitated for the opening of the ventilator cover, and the risks of incorrect closure of the mechanism are reduced, since it is arranged at a location which makes it more visible. Furthermore, the ground clearance of the engine assembly 1 may be reduced to the minimum thereof since the access of an operator below this assembly, in order to open the ventilator covers, no longer has to be taken into account. The reduction of the ground clearance enables the diameter of the ventilator to be increased, and therefore enables the existing requirements for increasing the dilution level to be complied with in a simple manner.

Figure 7:
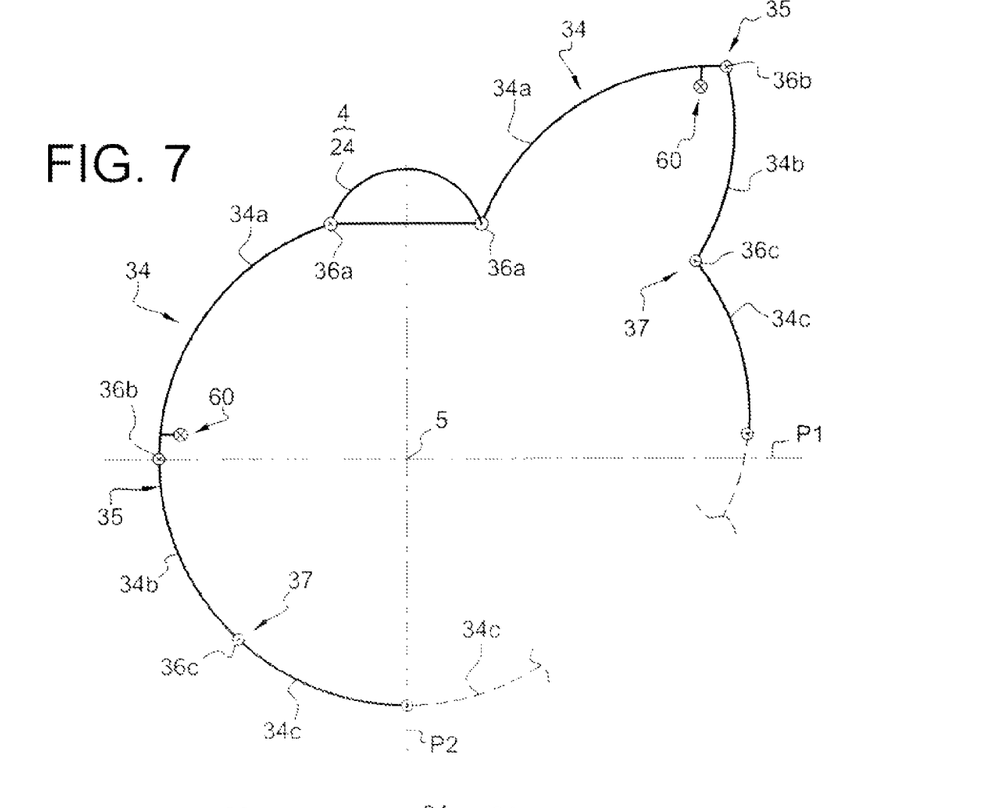
FIG. 7 is a schematic view showing the two ventilator covers according to an embodiment of the invention, in a closed position and in an open position, respectively.

FIG. 7 illustrates the two ventilator covers 34. The one at the left-hand side is in a closed and locked position. The one at the right-hand side is in an open position, folded in the manner of a wallet with the two cover sectors 34a, 34b opposite each other. When the two ventilator covers 34 are in a closed position, the two cover sectors 34c are arranged in aerodynamic continuation of each other, in the angular position at 6 o'clock. They are substantially diametrically opposed relative to the fastening strut 4 with the aerodynamic junction between the two sectors 34c located in the plane P2.

FIGS. 8a to 8d show the ventilator cover in different states during an opening operation, beginning by the actuation of the handle 62. By way of indication, it should be noted that the elements for carrying out the opening of the covers may be conventional, such as hydraulic or pneumatic jacks, or even a compensation spring system.

Furthermore, it should be noted that, in order to allow the opening of an inverter cover 33 independently of the adjacent ventilator cover 34, a system which can be disengaged may be provided in order to allow the extraction of the rollers 46 out of the rail 48. This system which can be disengaged may, for example, involve making provision for the inner branch of the C of this rail to have, at the lower portion, a portion which can be retracted as required. After this portion has been retracted, the rail 48 and the rollers 46 automatically decouple during the pivoting movement of the inverter cover 33, which can be seen when it is opened.

Figure 8A:
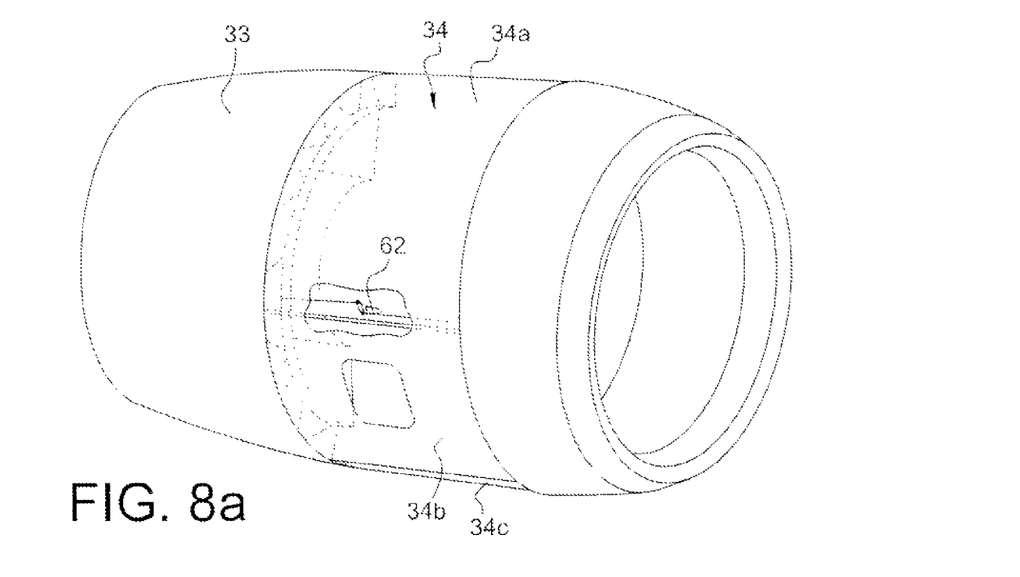
FIGS. 8a to 8d show one of the ventilator covers in different states during an opening operation of this cover.
Figure 8B:
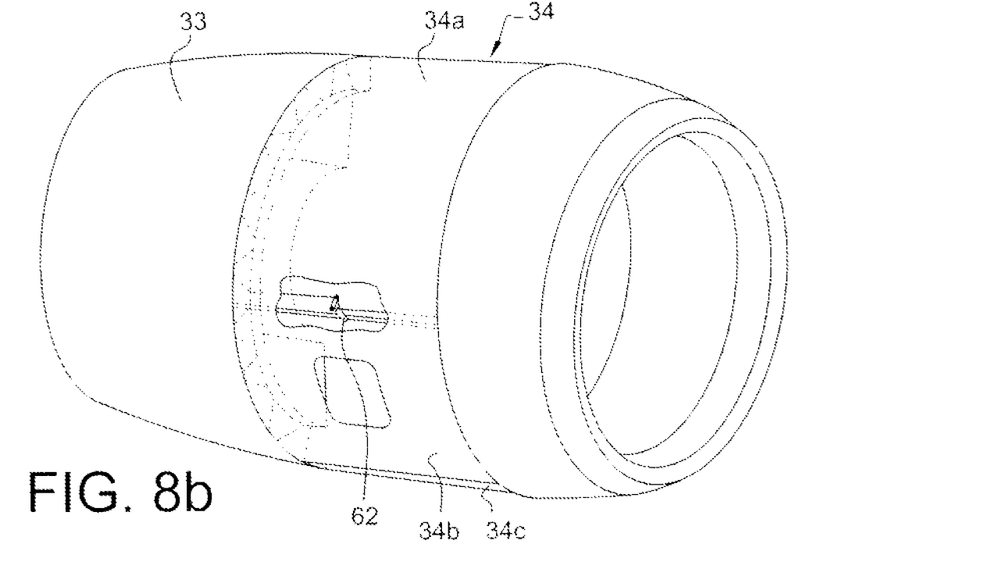
Figure 8C:
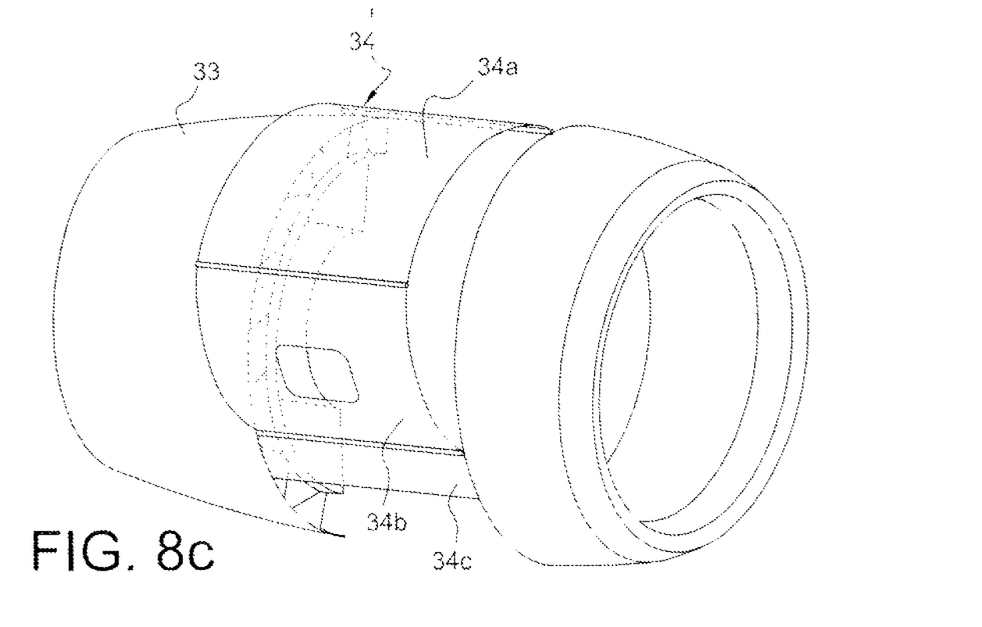
Figure 8D:
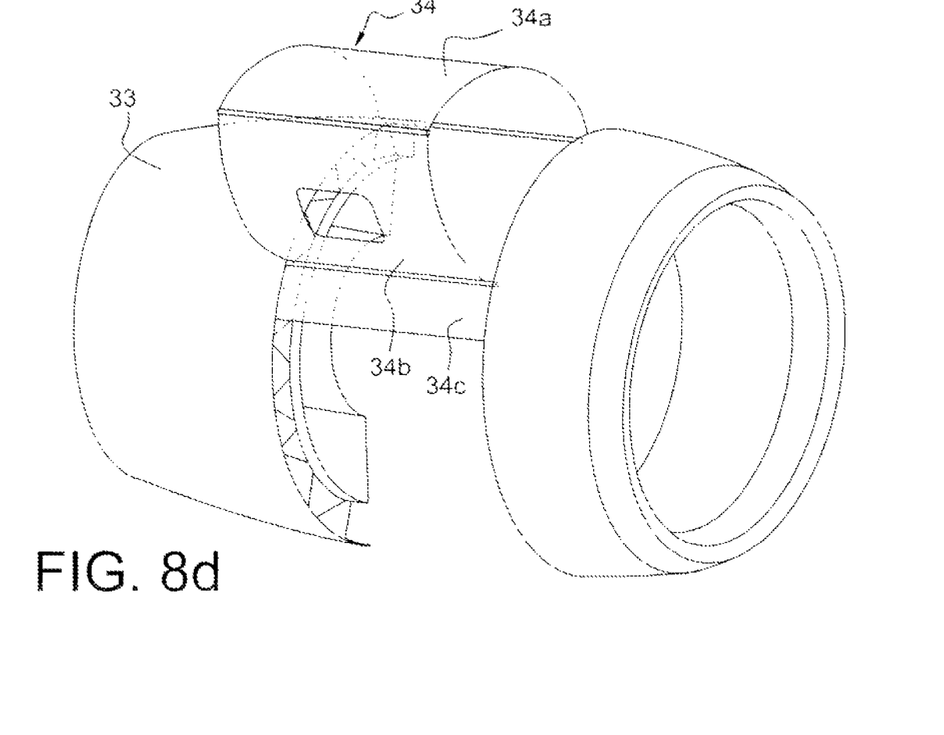
Figure 9:
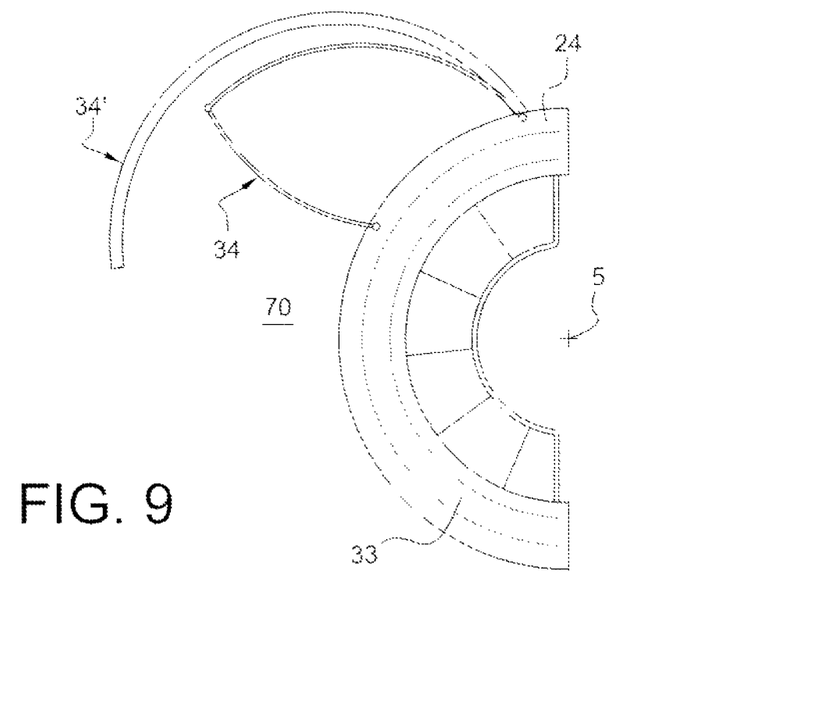
FIG. 9 is a schematic view comparing the opening kinematics of a ventilator cover of the prior art with the opening kinematics of a ventilator cover according to an embodiment of the invention.

In the open position of the cover 34 as illustrated in FIG. 8d and in FIG. 9, this cover is folded in the manner of a wallet and provides an easy access 70 to the inner side of the nacelle. This access may be larger than that obtained with a conventional ventilator cover 34' which is illustrated by way of example in FIG. 9. Furthermore, the enlargement of the access 70 is not carried out to the detriment of the vertical spatial requirement of the open cover since, in contrast, the high point of the folded open cover 34 is located at a lower height than that of the high point of the open cover 34' of the prior art. Therefore, the risks of mechanical interactions with the movable flaps of the leading edge of the wing are advantageously reduced. This may also enable the ventilator to be enlarged, and therefore the level of dilution of the turbojet to be increased.

Finally, the projection action of the open cover 34 is limited as a result of the configuration specific to the invention so that the hinges which ensure the articulation of the cover sector 34a to the strut may be small. The same applies to the means for opening the ventilator covers, of the above-mentioned type. This advantageously results in a gain in terms of overall mass of the engine assembly, which can be seen in a gain in terms of fuel consumption.

Of course, various modifications may be applied by the person skilled in the art to the invention which has been described above, purely by way of non-limiting examples.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft engine assembly comprising:
   a turbomachine;
   an engine pylon configured to fasten the turbomachine to an aircraft; and
   a first fan cover surrounding the turbomachine, the first fan cover having a closed position where the first fan cover is unfolded and an open position where the first fan cover is folded, the first fan cover comprising:
      a first cover sector that extends circumferentially around the turbomachine in the closed position, the first cover sector comprising a first end portion mounted to the engine pylon, the first cover sector configured to hinge, along a first articulation axis at the first end portion relative to the engine pylon, the first cover sector also comprising a second end portion opposite the first end portion; and
      a second cover sector that extends circumferentially around the turbomachine in the closed position, the second cover sector comprising a first end portion mounted to the second end portion of the first cover sector, the second cover sector configured to hinge relative to the first cover sector along a second articulation axis parallel with the first articulation axis, the second cover sector also comprising a second end portion opposite the first,
   wherein the second end portion of the second cover sector is mounted at a rear axial position to a thrust reverser cover of the engine assembly and mounted at a forward axial position to a circumferentially extending air inlet structure of the engine assembly, the second end portion of the second cover sector is configured to be guided to and from the open and closed positions along the respective circumferences of the thrust reverser cover and air inlet structure.

2. The engine assembly as claimed in claim 1, wherein the thrust reverser cover comprises a first guiding rail and the air inlet structure comprises a second guiding rail, the guiding rails for the second end portion of the second cover sector.

3. The engine assembly as claimed in claim 2, wherein the first and second guiding rails each has a shape substantially in the form of a circular arc, centered on an axis of the engine assembly.

4. The engine assembly as claimed in claim 1, wherein the first fan cover comprises a mechanism for locking the first fan cover in a closed position, the mechanism cooperating with at least one of the thrust reverser cover and the air inlet structure.

5. The engine assembly as claimed in claim 4, wherein the mechanism for locking the first fan cover comprises a handle arranged close to an articulated connection between the first cover sector and the second cover sector.

6. The engine assembly as claimed in claim 5, wherein the handle is arranged, in the closed position of the first fan cover, on or close to a diametral plane of the engine assembly, in a state orthogonal to a diametral plane of the engine assembly extending via the engine pylon.

7. The engine assembly as claimed in claim 1, the first fan cover further comprising a third cover sector comprising a first end mounted to the second end portion of the second cover sector, the third cover sector configured to hinge relative to the second cover sector along a third articulation axis parallel with the first articulation axis, the third cover sector comprising a second end portion opposite the first, the third cover sector mounted so as to be guided at one side and the other thereof by the thrust reverser cover and the air inlet structure, respectively.

8. The engine assembly as claimed in claim 7, wherein the thrust reverser cover comprises a first guiding rail and the air inlet structure comprises a second guiding rail, the guiding rails for the second end portion of the second cover sector, and wherein the second end portion of the third cover sector cooperates, at one side and the other thereof, with the the first and second guiding rails, respectively.

9. The engine assembly as claimed in claim 1, wherein at least one of the cover sectors includes an inspection hatch.

10. The engine assembly as claimed in claim 1, wherein the first and second cover sectors are configured to fold in the manner of a wallet along the second articulation axis when the first fan cover is moved from the closed position to the open position.

11. The engine assembly as claimed in claim 1, further comprising a second second fan cover, each of the the first fan cover and the second fan cover extending around the turbomachine over approximately 180°.

12. The engine assembly as claimed in claim 11, wherein each of the first fan cover and the second fan cover further comprise a third cover sector comprising a first end mounted to the second end portion of the second cover sector, the third cover sector configured to hinge relative to the second cover sector along a third articulation axis parallel with the first articulation axis, the third cover sector comprising a second end portion opposite the first, the third cover sector mounted so as to be guided at one side and the other thereof by the thrust reverser cover and the air inlet structure, respectively, wherein, in the closed positions of the the first and second fan covers, the two third cover sectors are arranged in aerodynamic continuation of each other, being substantially diametrically opposed relative to the engine pylon.

13. An aircraft comprising:
a first engine assembly comprising:
 a turbomachine;
 an engine pylon configured to fasten the turbomachine to a component of the aircraft; and
 a first fan cover surrounding the turbomachine, the first fan cover having a closed position where the first fan cover is unfolded and an open position where the first fan cover is folded, the first fan cover comprising:
  a first cover sector that extends circumferentially around the turbomachine in the closed position, the first cover sector comprising a first end portion mounted to the engine pylon, the first cover sector configured to hinge, along a first articulation axis at the first end portion relative to the engine pylon, the first cover sector also comprising a second end portion opposite the first end portion; and
  a second cover sector that extends circumferentially around the turbomachine in the closed position, the second cover sector comprising a first end portion mounted to the second end portion of the first cover sector, the second cover sector configured to hinge relative to the first cover sector along a second articulation axis parallel with the first articulation axis, the second cover sector also comprising a second end portion opposite the first,
 wherein the second end portion of the second cover sector is mounted at a rear axial position to a thrust reverser cover of the engine assembly and mounted at a forward axial position to a circumferentially extending air inlet structure of the engine assembly, the second end portion of the second cover sector is configured to be guided to and from the open and closed positions along the respective circumferences of the thrust reverser cover and air inlet structure.

14. The aircraft as claimed in claim 13, further comprising a first wing, a second wing, and a second engine assembly, wherein the first engine assembly and the second engine assembly are suspended under the first wing and the second wing, respectively.

* * * * *